Figure 1:
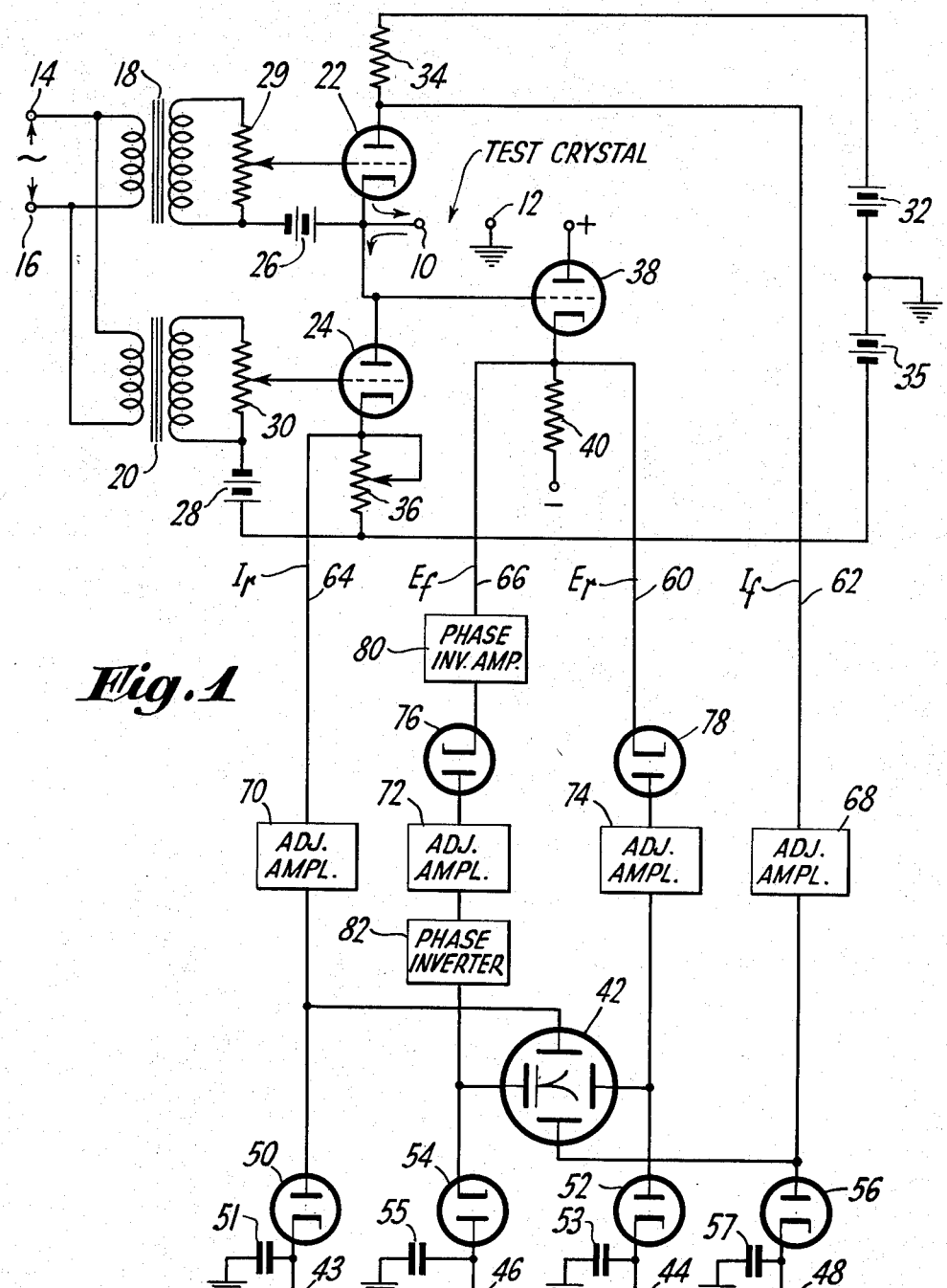

May 29, 1956

F. E. FLAHERTY 2,748,347

ELECTRICAL TEST CIRCUITS

Filed May 27, 1950

2 Sheets-Sheet 1

INVENTOR
FRANCIS E. FLAHERTY
BY
*Paul S. Martin*
ATTORNEY

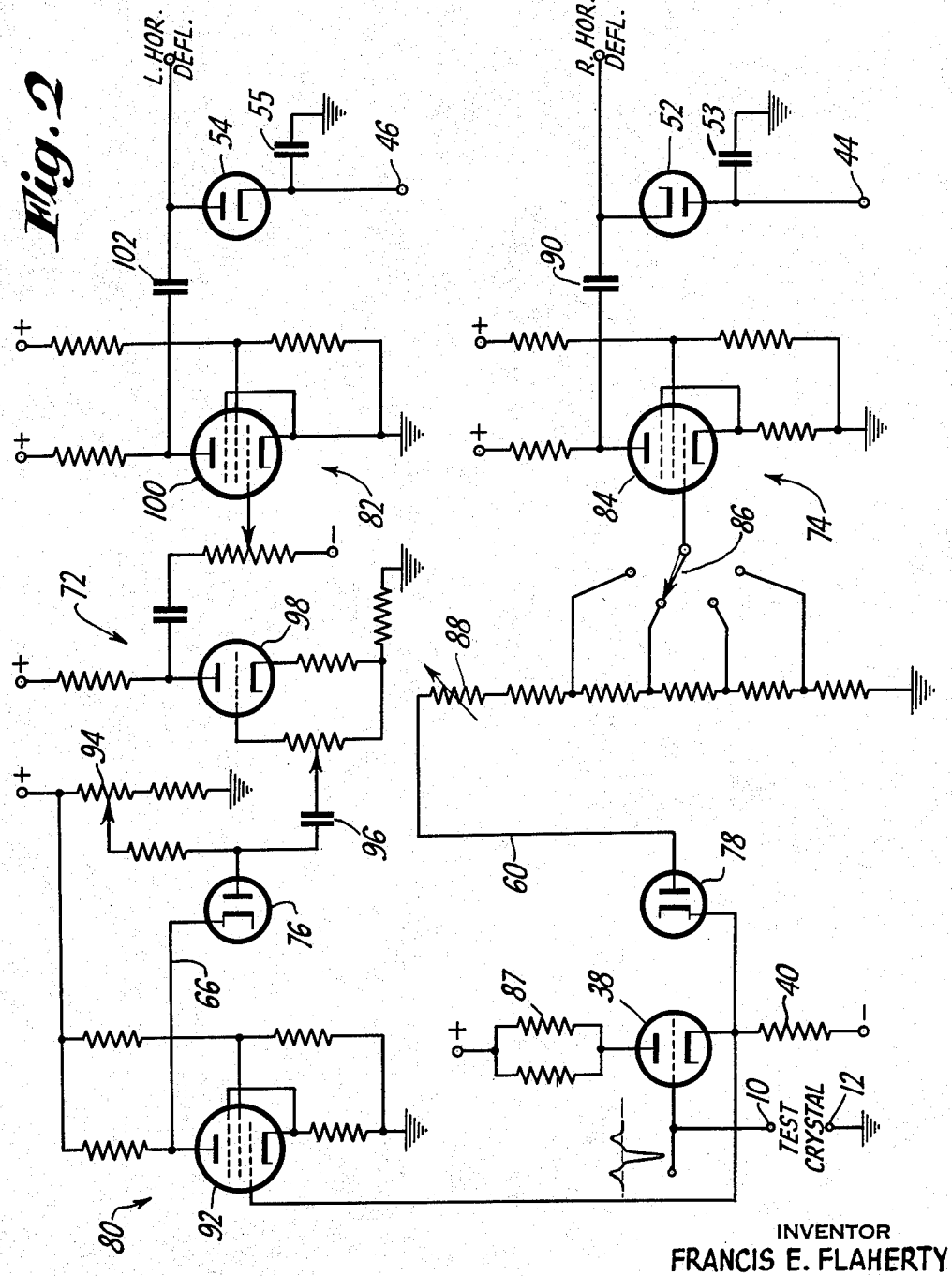

United States Patent Office 2,748,347
Patented May 29, 1956

2,748,347
ELECTRICAL TEST CIRCUITS

Francis E. Flaherty, Dorchester, Mass., assignor to Sylvania Electric Products Inc., a corporation of Massachusetts Application May 27, 1950, Serial No. 164,648

7 Claims. (Cl. 324—158)

This invention is concerned with electrical circuits and in several aspects deals with test circuits and methods, with oscillographs, and with cathode ray deflection circuits.

The various aspects of an illustrative embodiment of the invention are described in detail below, and the procedures and implementing circuits represent cooperating features of the invention particularly adapted to the testing of semiconductor rectifiers. However, these procedures and circuits will be recognized by those skilled in the art as being useful separately, as well as valuable in the particular combination described. For example, devices having more than two terminals can be tested at two terminals with suitable energization of the other terminals.

Using the novel apparatus and procedures, point-contact crystal rectifiers are tested by impressing voltages on them varying sinusoidally or otherwise between zero and different limits in the forward conducting direction and in the reverse or high back-resistance direction. It may be that no more than one volt should be applied to the crystal in the forward direction, depending on the maximum safe current it would pass at that voltage; and two-hundred volts may be required for proper evaluation of the back-resistance characteristic. The illustrative circuit separately controls the ranges of forward and reverse applied voltage. Accordingly, one object of the invention is to provide a circuit for cyclically applying two independent ranges of voltage of opposite polarity to a two-terminal device.

A further object is to display both forward and reverse characteristics concurrently, and to show each characteristic according to scales of current and voltage that utilize a large area of the cathode-ray screen. The current passed by the test rectifier in the forward direction at low applied voltage is likely to be several times that reached in the back direction, and as noted above there is a great difference in forward and reverse ranges of applied voltage. In the illustrative embodiment these ranges of current and voltage are separately transmitted to a cathode-ray tube. In each transmission network the amplitude of the signal is adjusted so that both characteristics are large, the traces being spread both horizontally and vertically according to normally different scale calibrations for effective utilization of the area of the cathode-ray tube screen.

In another aspect, the invention is concerned with the display on the screen of a one-beam cathode-ray tube of any two characteristics. These are derived in rapidly alternating succession and are applied to the cathode-ray tube with a novel circuit and in a new manner. In this connection an arrangement is provided for stabilizing the tube against spurious interference due to the signals of each characteristic while the other is being displayed.

The illustrative testing circuit for crystal or point-contact rectifiers includes two grid-controlled tubes that are used during alternating halves of an energizing alternating current cycle to apply test voltage to the terminals of the diode in the forward and reverse directions, respectively, each tube being biased to cut off while the other is effective. Despite the connection of the other tube in the circuit, each tube separately controls the range of test energy applied during its effective half-cycles.

During the time that the test rectifier passes current in the forward direction, a voltage representing the forward current is amplified in one channel and a voltage proportional to the applied voltage is amplified in the second channel. These resulting amplified voltages are applied to one of the vertical deflection plates and one of the horizontal deflection plates of a single-beam cathode-ray tube while the opposite plate of each pair is stabilized. Similarly, an additional pair of amplifying channels transmits signals representing current and voltage of the back rectifier characteristic, and these are applied to the remaining horizontal plate and vertical plate, while the first-mentioned plate of each pair is maintained at stable potential.

A further feature of the invention is the utilization of the full width of the screen for displaying the characteristics on as large a calibrated scale as possible. To this end the beam is normally deflected to one side of the screen. One horizontal plate is then energized to attract the beam to various deflection positions for displaying one characteristic, whereas the other horizontal plate is energized to repel the beam for displaying the other characteristic, fully utilizing the width of the screen for each characteristic displayed.

The invention involves certain additional features some of which are separately useful, but all of which cooperate in the illustrative embodiment for concurrently displaying forward and reverse rectifier characteristics. In the accompanying drawings:

Fig. 1 is the wiring diagram partly in block diagram form of the entire illustrative system for displaying the forward and reverse crystal rectifier characteristics; and Fig. 2 is a wiring diagram of two channels forming a portion of the system in Fig. 1.

The diode to be tested is connected at terminals 10 and 12, the latter conveniently connected to ground as a direct-current reference point. A pair of circuits branch from the test diode. One of the branch circuits includes vacuum tube triode 22, resistor 34 and direct-current supply 32 that is returned to ground and terminal 12. The other branch circuit includes vacuum tube triode 24, resistor 36 and direct-current supply 35, that is returned to ground and terminal 12. One terminal each of resistor 34, of resistor 36, and of the tested device is connected to a stable potential point, enabling separation of signal voltages with single-sided amplifiers. The negative terminal of direct-current supply 32 is grounded, and the positive terminal of supply 35 is grounded. The cathode of triode 22 is connected to terminal 10, and the anode of triode 24 is connected to terminal 10. These circuit features enable separate derivation and transmission of the several signals in alternating pairs for representing the two characteristics, as will appear.

Triodes 22 and 24 are normally biased to cut off by direct-current supplies 26 and 28 respectively. These triodes are rendered alternately conductive by oppositely phased transformers 18 and 20 that are energized by commercial alternating-current power applied at input points 14 and 16. The range of conductivity of tubes 22 and 24 can be separately adjusted by manipulating potentiometers 29 and 30 for adjusting the positive-varying grid drive.

The two branch circuits thus impress voltages of opposite polarity on the test crystal, and these voltages vary with time from zero to independent maxima and back to zero in each direction. Tubes 22 and 24 are seen to conduct in alternate half-cycles, and they pass the entire current passed by the test rectifier, whether it be high or low and irrespective of the time-rate of variation. The limits of the current passed are controlled by the tubes, and can be adjusted so that the crystal will be tested in any desired range of forward or reverse energization. The voltage applied to the crystal is also independently controlled during the respective half-cycles.

Conveniently, the energizing voltage at terminals 14 and 16 is a sine wave, but virtually any wave form can be used, saw-tooth for example, without affecting the accuracy of the system. The arrangement is so flexible as to be able to use commercially available power, and requires no special signal generator.

The voltage developed across resistor 34 during the conductive half-cycles of triode 22 is a signal measuring the forward current passed by the test crystal during that conductive half-cycle, and the voltage resistor across 36 (or equivalent ohmic or linear impedance) is a signal measuring the back current passed by the test crystal during the half-cycles when tube 24 is conductive and tube 22 is cut off. These signals are separately transmitted to the display means to be described. Each transmission channel is independent of the other, so that different appropriate amplification can be effected in each.

The voltage across the test crystal in both half-cycles is transmitted to two channels by a cathode follower stage having its grid connected to terminal 10 and having a load impedance 40, advantageously a resistor. Changes in voltage differing from the normal cathode-follower bias voltage represent the voltage applied to the crystal during the respective half-cycles of opposite polarity. The voltage across resistor 40 rises during the conductive half-cycles of tube 22, whereas the voltage across resistor 40 drops below the normal bias voltage during the conductive half-cycles of triode 24. As will be seen, these voltage changes are separately transmitted to the display means via two separate channels.

The voltage applied to the diode being tested and the signal developed by the current of the test diode during alternate half-cycles are utilized to trace one characteristic. The applied test voltage and current-measuring signal of the intervening half-cycles are utilized to trace the other characteristic. These paired signals can be applied to separate oscilloscopes, or to a single oscilloscope as in the following unique fashion.

In order to represent the forward characteristic of the test device, the signal developed across resistor 34 is transmitted to the lower vertical plate of cathode-ray tube 42 while the upper vertical plate is maintained at stable potential, and the voltage applied to the test crystal during that interval is transmitted to the left horizontal plate of the cathode-ray tube. Similarly, the back characteristic is represented on the oscilloscope by the signal across resistor 36 transmitted to the upper vertical plate, and the back voltage across the test crystal is transmitted to the right horizontal plate. The phosphor of the screen should have a relatively slow decay characteristic.

Voltages for positioning the beam at a desired spot in the absence of deflecting signal voltage are applied at terminals 43, 44, 46 and 48 through rectifiers 50, 52, 54 and 56, suitably bypassed by condensers 51, 53, 55 and 57. Rectifiers 50, 52, 54 and 56 are polarized so that each will block a signal of the polarity required for deflecting the beam from the left center of the screen up or down and across the screen. Thus, the left hand plate and both vertical plates require negative signal drive in the arrangement shown. The right hand plate requires positive signal drive. Both vertical plates could be operated with positive drive should it be so desired, and the diode connections should then be reversed. Rectifiers 50, 52, 54 and 56 are connected to the positioning voltage supply and the deflection plates are thereby stabilized during their respective idle half-cycles. Load resistors or chokes can be used in place of these rectifiers, but to some disadvantage.

Each signal-transmitting channel terminates with a direct-current blocking coupling condenser embodied in the final amplifiers and the diodes inherently have a certain minimum leakage resistance that prevents the deflection plates from "floating" by unintentional build-up of static potential of the same polarity that causes deflection. The negative half-cycles of signal derived from resistor 34 deflect the beam upward as a measure of current related at every instant to the horizontal deflection of the beam by the left hand plate when energized by a signal representing the instantaneous applied voltage. Similarly, the reverse current-voltage characteristic of the test crystal is derived from resistor 36 and from cathode follower 38 for application to the top and right hand deflection plates, respectively. Channels 60, 62, 64 and 66 apply the reverse voltage, the forward current, the reverse current and forward voltage, respectively, according to the polarity required. A suitable amplifier 68 in channel 62 is provided to adjust the deflection effected by the lower vertical plate to desired extent for forward currents of the test crystal. Amplifier 70 adjusts the signal representing reverse crystal current to the proper level for the top vertical plate. Similarly, adjustable amplifier 72 in channel 60 and adjustable amplifier 74 in channel 66 adjust the signals applied to the horizontal plates to represent the forward and reverse voltages applied to the crystal. Diodes 76 and 78 in channels 60 and 66 respectively are properly biased by direct-current connections in the input and output circuit portions, so as to pass only the forward-voltage signal and the reverse-voltage signal, respectively, blocking that portion of the signal across resistor 40 that relates to the opposite channel. In the circuit shown diodes 76 and 78 are polarized alike, but an inherently phase-inverting amplifier 80 is interposed in channel 66 between resistor 40 and diode 76.

Channels 60 and 66 both include an odd number of amplifying stages. Phase inverting stage 82 is included in channel 66 in addition to amplifiers 72 and 80 for proper sign of the signal output. It will be apparent that since both channels 60 and 66 include an odd (or even) number of amplifying stages, and because diodes 76 and 78 render these channels effective during alternate half-cycles of the potential applied to the rectifier, these channels actually apply deflection voltages of opposite polarity to the respective horizontal plates, positive voltage to the right hand plate and negative voltage to the left hand plate so as appropriately to attract or repel the electron beam from its normal position at a left hand edge of the screen. Channels 62 and 64 which derive current-measuring signals of opposite polarity are effective during alternate half-cycles of energizing potential. The lower plate receives a negative deflection voltage through two-stage amplifier 68 and the upper plate also receives a negative deflection voltage through single-stage amplifier 70. Resistor 34 is advantageously of a much lower value than resistor 36 and despite the higher current through resistor 34, channel 62 is operated at higher gain than channel 64.

The circuit details of channels 60 and 66 are shown in Fig. 2. Diode 78 for blocking forward-voltage variations across resistor 40 of cathode follower 38 is coupled to pentode 84 of amplifier stage 74 through a range selecting potentiometer 86. The resting potential of diode 78 is established by adjusting resistor 40 to the proper value, by interposing one or more trimmer resistors 87 in the anode return of the cathode follower and by selection of proper direct-current supply voltages. Rheostat 88 adjusts the calibration established by range selector 86. The amplified output of pentode 84 is impressed through direct-current blocking capacitor 90 on the right horizontal deflection plate of the cathode ray tube. Signal variations in the negative direction are bypassed to ground through diode 52 and bypass condenser 53, the right horizontal deflection plate being thus effectively biased at the potential of terminal 44.

Channel 60 includes but the single pentode amplifier stage 84 for transmitting back voltage signals, that normally tend to be high. The relatively low forward-voltage signals developed across the test crystal are amplified in pentode 92 to a suitable level before the forward voltage is impressed on back voltage blocking diode 76. The latter is adjustably biased by potentiometer 94, and the amplified forward signal is transmitted to coupling condenser 96 to cascade amplifying stages 72 and 82, both of which are adjustable. The output of stage 82 is coupled through condenser 102 to the left horizontal deflection plate, positive varying signals relative to the potential of terminal 46 being diverted through diode 54 through bypass condenser 55 to ground.

It is seen that alternately developed pairs of signals are applied to a single-beam cathode-ray tube via four channels in pairs. Each of the channels is independently adjustable as to gain, so that dissimilar voltages may cause wide-range deflections for effective display of the two characteristics. Any two alternately developed curves may thus be displayed, and they may be generated in alternation by such modification of the illustrative circuit as will be readily apparent to those skilled in the art. The specific circuit illustrated is however uniquely suited to the testing of two-terminal devices such as point-contact rectifiers.

Other variations and applications will occur to those skilled in the art, and it is therefore appropriate that the appended claims be interpreted broadly, consistent with the spirit and scope of this invention.

What I claim is:

1. A test circuit for a non-linear electrical device having two terminals, said circuit having a pair of terminals for a device to be tested, branch circuits extending from one of said pair of terminals to the other of said pair of terminals and each circuit including a unidirectionally conductive device, said devices being polarized to be conductive alternately and said branch circuits including sweep-signal energizing means, said branch circuits thereby being effective to impress electrical potential of alternating polarity and time-varying magnitude on the terminals of the test device, resistors in each of said branch circuits, and means for displaying the current-voltage characteristic of the test device in each direction of conductivity including direct connections to said test device to obtain signals representing the applied voltage and connections to said resistors to obtain signals representing the corresponding currents passed by said test device.

2. A test circuit for a two-terminal non-linear electrical device, said circuit having branch circuits for impressing electrical potential of alternating polarity and variable magnitude on the terminals of the test device and including unidirectionally conductive devices poled oppositely in the respective circuits and means impressing time-varying electrical energization in said circuits when conductive, resistors in each of said branch circuits, and means for displaying separately the current-voltage characteristics of the test device in each direction of conductivity including direct connections to said test device to obtain signals representing the applied voltage and connections to said resistors to obtain signals representing the corresponding currents passed by said test device in each direction, the displaying means including a single beam cathode-ray tube having a horizontal pair of the deflection plates and a vertical pair of deflection plates, said resistors each having a connection to a respective one of said vertical plates and said test device having alternately conductive connections to said horizontal plates in alternation.

3. An electrical circuit for displaying the forward and reverse characteristics of semiconductor diodes and thus testing such diodes, including a pair of terminals for a test diode, a first grid controlled vacuum tube, a linear impedance, and a direct-current supply connected in series to the terminals for the test diode, a second grid controlled vacuum tube, a second linear impedance, and a second direct-current supply also connected in series to the terminals for the test diode, the cathode of one of said vacuum tubes having a junction to the anode of the other of said vacuum tubes and this junction of said branch circuits constituting one of said terminals for the test diode, the opposite terminals of said series circuits being joined together at a junction constituting the other of said pair of test terminals, means normally biasing said vacuum tubes to cut off and means applying alternating current signal input to said vacuum tubes and connected to the control grids thereof in proper phase relationship to drive said tubes into conductive state in alternation, and a single-beam cathode-ray tube having a pair of horizontal deflection plates and a pair of vertical deflection plates, each of said vertical deflection plates having an amplifying channel connected to a respective one of said linear impedances at the side thereof having signal voltage variations, and each of said horizontal plates having separate amplifying channels to the junction of said vacuum tubes, the channels of the horizontal deflection plates including means blocking said channels during respective alternating half-cycles of said alternating current signal.

4. Apparatus for concurrently deriving forward and reverse current-voltage characteristics of an electrical device having two terminals, including parallel circuits effective to separately and alternately impress time-varying voltages on said device, said circuits each having an ohmic resistor connected in a series circuit with the electrical device so as to transmit at least a portion of the current of that device at alternate intervals effective to derive current-representing signals, and a pair of transmission channels each including a translator responsive only to signal variations of pre-established polarity, said channels having common energizing connections to the terminals of the test device.

5. Apparatus for concurrently deriving forward and reverse current-voltage characteristics of an electrical device having two terminals, including parallel circuits effective to separately and alternately impress time-varying voltages on said device, said circuits each having an ohmic resistor for deriving current-representing signals, and a pair of transmission channels each including a unidirectionally conductive device responsive only to signal variations of pre-established polarity, said channels having common energizing connections to the terminals of the test device, and a four-plate cathode-ray tube having a plate coupled linearly to each of said resistors and said channels respectively during the times when the respective unidirectionally conductive devices are conductive.

6. A circuit for energizing electrical devices having two terminals and for displaying effects of such energization, said circuit including a pair of grid controlled vacuum tubes connected to each other at a first junction with their electron discharge spaces in a first series circuit having end points, a pair of direct-current supplies connected to each other at a second junction and in a series circuit also having end points, the end points of each of said series circuits being connected to a respective end point of the other of said series circuits, said junctions constituting terminals for the device to be energized, said device terminals being connected to said first and second junctions, a respective ohmic load impedance in said first series circuit and in said second series circuit between each of said vacuum tubes and a respective one of the end points of said series-connected direct-current supplies, and means for displaying the current-voltage characteristics of the test device for each direction of conductivity including direct connections to said device terminals to obtain signals representing the applied voltage and connections to the said respective ohmic load impedances to obtain signals representing the corresponding currents passed by said test device, said circuit including alternating current energizing means for the grids of said said vacuum tubes of such phasing as to render the respective vacuum tubes conductive in alternation and thereby to display in succession the current-voltage characteristics of the test device in both directions of energization.

7. A test circuit in accordance with claim 6 wherein the grids of said vacuum tubes include separate coupling circuits to a common alternating current source constructed and arranged to apply controlled alternating current signals of independent values to the respective vacuum tubes.

References Cited in the file of this patent

UNITED STATES PATENTS

| | | |
|---|---|---|
| 1,860,182 | Howard | May 24, 1932 |
| 1,870,027 | Sabbah | Aug. 2, 1932 |
| 2,145,707 | Biermans | Jan. 31, 1939 |
| 2,208,379 | Luck | July 16, 1940 |
| 2,245,168 | Suits | June 10, 1941 |
| 2,278,641 | Bond | Apr. 7, 1942 |
| 2,283,951 | Ripley | May 26, 1942 |
| 2,297,949 | Farnsworth | Oct. 6, 1942 |
| 2,405,231 | Newhouse | Aug. 6, 1946 |
| 2,406,405 | Salisbury | Aug. 27, 1946 |
| 2,432,944 | Shillington | Dec. 16, 1947 |
| 2,444,338 | Dimond | June 29, 1948 |
| 2,481,247 | Schott | Sept. 6, 1949 |
| 2,539,402 | Clark | Jan. 30, 1951 |

OTHER REFERENCES

Article entitled "Testing Selenium Rectifier Cells," in General Electric Review for November 1944, pages 53, 54 and 55.